US012569081B2

(12) United States Patent　　　(10) Patent No.: US 12,569,081 B2

Sullivan　　　　　　　　　　　　　　(45) Date of Patent: *Mar. 10, 2026

(54) REMOVABLE PLANT HANGER

(71) Applicant: Patrick Sullivan, Fort McMurray (CA)

(72) Inventor: Patrick Sullivan, Fort McMurray (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/016,295

(22) Filed: Jan. 10, 2025

(65) Prior Publication Data

US 2025/0143490 A1　　May 8, 2025

Related U.S. Application Data

(63) Continuation-in-part of application No. 17/971,918, filed on Oct. 24, 2022, now Pat. No. 12,336,650, which is a continuation of application No. 17/181,401, filed on Feb. 22, 2021, now Pat. No. 11,478,092, which is a continuation of application No. 16/052,107, filed on Aug. 1, 2018, now Pat. No. 10,932,595.

(51) Int. Cl.
　　*A47G 7/04*　　　　(2006.01)
　　*F16M 13/02*　　　(2006.01)

(52) U.S. Cl.
　　CPC ........... *A47G 7/044* (2013.01); *F16M 13/022* (2013.01)

(58) Field of Classification Search
　　CPC .................................. A47G 7/044; A47G 7/04
　　See application file for complete search history.

(56) References Cited

U.S. PATENT DOCUMENTS

| | | | | |
|---|---|---|---|---|
| 3,490,726 A | * | 1/1970 | Mills ......................... | A01K 5/01 |
| | | | | 248/312.1 |
| 5,118,059 A | * | 6/1992 | Mainer ................ | A47B 96/061 |
| | | | | 248/314 |
| 5,313,910 A | * | 5/1994 | Wittman ................ | A01K 39/01 |
| | | | | 248/303 |
| 5,320,319 A | * | 6/1994 | Winger .................. | A47G 7/044 |
| | | | | 248/312.1 |
| 5,368,267 A | * | 11/1994 | Howard ................. | A47G 7/044 |
| | | | | 248/274.1 |

(Continued)

FOREIGN PATENT DOCUMENTS

| | | | | | |
|---|---|---|---|---|---|
| DE | 102010026124 A1 | * | 1/2012 | ............. | A47G 7/044 |
| EP | 1308113 A1 | * | 5/2003 | ............. | A47G 7/044 |

(Continued)

*Primary Examiner* — Monica L Perry

(74) *Attorney, Agent, or Firm* — Frost Brown Todd LLP

(57) ABSTRACT

A removable plant holder system includes a plant holder assembly having a coupling-frame and an extension arm-member. The coupling-frame includes a cross-member having a right-hooked-end and a left-hooked-end for removably mounting to a railed deck. Each of the right-hooked-end and the left-hooked-end engages at least one vertical-rail of the railed deck. The extension arm-member has a proximate end attached to the coupling-frame and a distal end configured for hanging a plant therefrom. Alternate embodiments of the removable plant holder system include a support arm-member attached to the extension arm-member for reinforcement and/or ornamentation, and various configurations of the coupling-frame for engaging at least one vertical-rail of the railed deck in a specified manner.

23 Claims, 10 Drawing Sheets

(56)                    References Cited

U.S. PATENT DOCUMENTS

| | | | | |
|---|---|---|---|---|
| 5,395,080 | A  * | 3/1995 | Smith | A47G 7/045 |
| | | | | 248/312.1 |
| 5,586,413 | A  * | 12/1996 | Sharon | A47G 7/041 |
| | | | | 248/318 |
| 7,024,816 | B1 * | 4/2006 | Marks | A47G 7/045 |
| | | | | 47/66.6 |
| 8,336,837 | B2 * | 12/2012 | Gephart | F16B 2/12 |
| | | | | 248/229.12 |
| 8,955,808 | B2 * | 2/2015 | Buschbach | F16M 13/02 |
| | | | | 248/214 |
| 9,814,305 | B2 * | 11/2017 | Brus | A47G 7/044 |
| 9,958,112 | B1 * | 5/2018 | Johnson | A47G 7/045 |
| 2003/0052073 | A1 * | 3/2003 | Dix | A47G 7/044 |
| | | | | 211/90.02 |
| 2011/0303809 | A1 * | 12/2011 | Tincher | A47G 23/0225 |
| | | | | 248/214 |
| 2013/0240697 | A1 * | 9/2013 | Rutigliano | F16B 45/005 |
| | | | | 248/227.1 |
| 2016/0025263 | A1 * | 1/2016 | Gibbons | F16B 2/22 |
| | | | | 248/220.22 |
| 2016/0353877 | A1 * | 12/2016 | Brus | A47B 5/02 |
| 2019/0150368 | A1 * | 5/2019 | Tori | A47G 7/045 |

FOREIGN PATENT DOCUMENTS

| | | | | |
|---|---|---|---|---|
| EP | 2266444 | A1 | 12/2010 | |
| WO | WO-2006095141 | A1 * | 9/2006 | A47G 7/044 |

* cited by examiner

REMOVABLE PLANT HANGER

BACKGROUND OF THE INVENTION

This application is a continuation-in-part of U.S. patent application Ser. No. 17/971,918 filed Oct. 24, 2022, which is a continuation of U.S. patent application Ser. No. 17/181, 401 filed on Feb. 22, 2021, now U.S. Pat. No. 11,478,092, which is a continuation of U.S. patent application Ser. No. 16/052,107 filed on Aug. 1, 2018, now U.S. Pat. No. 10,932,595, the disclosures of which are incorporated herein by reference in their entirety.

The following includes information that may be useful in understanding the present disclosure. It is not an admission that any of the information provided herein is prior art nor material to the presently described or claimed inventions, nor that any publication or document that is specifically or implicitly referenced is prior art.

The present invention relates generally to the field of hangers of existing art and more specifically relates to removable plant hangers as removable plant holder systems and methods of using same.

RELATED ART

Many individuals like to grow plants for human or animal consumption. Others may enjoy gardening and the growing of plants and flowers for esthetics. Flowers and plants when strategically placed can make a residential or commercial property look very inviting. The flowers may create a 'warm ambiance' as well as may smell fresh to visitors and residents. Often times the plants may be difficult to position if not in portable pots. Further, it may be desirable to hang the plants in various locations. A suitable solution is desired.

Foreign Patent Application No. EP2266444 to Harald Elderenbosch et al., relates to a plant holder system. The described plant holder system includes a system for supporting a plant holder, said plant holder system comprising a base frame comprising a frame fixating part for fixating the base frame to an item, such as a wall or balcony rim, and a holder support part for supporting the plant holder, and at least one holder fixating device for fixating the plant holder supported by the holder support part, wherein the at least one holder fixating device comprises at least one coupling part for coupling the holder fixating device to the base frame, at least one engaging part for engaging the plant holder supported by the holder support part, at least one support member for supporting a further plant holder system with the at least one holder fixating device coupled to the base frame, at least one fixating member for fixating the at least one the holder fixating device when supporting the further plant holder, and wherein the at least one holder fixating device is configured to in use support the further plant holder system such that the further plant holder system is orderly stacked on the plant holder system.

SUMMARY OF THE INVENTION

In view of the foregoing disadvantages inherent in the known hanger(s) and supports art, the present disclosure provides a novel removable plant hanger and methods of using same. The general purpose of the present disclosure, which will be described subsequently in greater detail, is to provide an efficient and effective removable plant hanger and methods of using same.

In one aspect of the present invention, a removable plant holder system in a first embodiment is disclosed herein comprising: at least one first plant holder assembly having a coupling-frame, an extension arm-member having a proximate end and a distal end; wherein the plant holder system comprises the at least one first plant holder assembly. The at least one first plant holder assembly is defined by the coupling-frame and the extension arm-member integrally combined for use. As such, the extension arm-member is defined by the proximate end attached to the coupling-frame, and the distal end is thus able to act in a capacity for hanging a plant therefrom; the coupling-frame configured for removable attachment with a railed deck.

A removable plant holder system in an alternate embodiment is also described herein comprising: at least one first plant holder assembly having a coupling-frame, a base-extension-arm-member having a receiver (negative volume slot), an extender-extension-arm-member having a proximate end, and a distal end; wherein the plant holder system comprises the at least one first plant holder assembly. In this embodiment the at least one first plant holder assembly is defined by the coupling-frame and the base-extension-arm-member combined with the extender-extension-arm-member via the receiver for use. The extender-extension-arm-member is defined by the proximate end attached to the base-extension-arm-member and to coupling-frame, and the distal end is able to act in a capacity for hanging a plant therefrom; the coupling-frame configured for removable attachment with a railed deck.

A further alternate embodiment may comprise an anchor member secured to the balcony rail, and the extension arm-member (hanger arm) comprises a separate piece which is secured to the anchor. This allows the user to change up 'the design' without removing the anchor.

A removable plant holder system in an alternate embodiment is also described herein comprising: at least one first plant holder assembly having a coupling-frame, an extension arm-member having a proximate end and a distal end, and a support arm-member attached to the extension arm-member in a substantially parallel configuration and being positioned in a plane above the extension arm-member. The support arm-member comprises a length extending from the distal end of the extension arm-member to a portion of the extension arm-member spanning a horizontal top-rail of the railed deck during an in-use condition. The support arm-member includes a substantially "S"-shaped profile and optionally, one or more embellishments. In this embodiment, the support arm-member strengthens or reinforces the extension arm-member in supporting the weight of the potted plant hanging therefrom, and optionally, also provides ornamentation.

Additional alternate embodiments of removable plant holder systems may comprise various configurations of a coupling-frame comprising a cross-member having a right-hooked-end and a left-hooked-end for removably mounting to a railed deck, each of the right-hooked-end and the left-hooked-end engaging at least one vertical-rail of the railed deck in a specified manner.

A further alternate embodiment may comprise a coupling-frame wherein the right-hooked end and the left-hooked end of the cross-member contour around the vertical rail to position the cross-member adjacent to and substantially perpendicular to the vertical rails of the railed deck during an in-use condition. The cross-member is configured to engage an internal face of the vertical-rail facing away from the distal end, with the left-hooked-end and the right-hooked end contouring towards an external face of the vertical-rail during the in-use condition.

A further alternate embodiment may comprise the proximate end of the extension arm-member attaching to the coupling-frame at the right-hooked-end.

A further alternate embodiment may comprise the right-hooked-end and the left-hooked-end configured to together engage a single vertical-rail.

In another aspect of the present invention, a method of holding a plant with a removable plant holder system comprises: attaching a coupling-frame of a removable plant holder system to a railed deck, wherein the removable plant holder system comprises: at least one first plant holder assembly having a coupling-frame comprising a cross-member having a right-hooked-end and a left-hooked-end for removably mounting to a railed deck, each of the right-hooked-end and the left-hooked-end engaging at least one vertical-rail of the railed deck; an extension arm-member having a proximate end attached to the coupling-frame and a distal end configured for hanging a plant therefrom, and optionally, a support arm-member attached to the extension arm-member in a substantially parallel configuration and being positioned in a plane above the extension arm-member; and hanging a plant upon said distal end of the extension arm-member; wherein the at least one first plant holder assembly is pulled into frictional engagement as the plant hangs, a mass of the plant pulling the coupling-frame tightly adjacent the railed deck.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a removable plant hanger system, constructed and operative according to the teachings of the present disclosure.

The various embodiments of the present invention will hereinafter be described in conjunction with the appended drawings, wherein like designations denote like elements.

DETAILED DESCRIPTION

Figure 1:
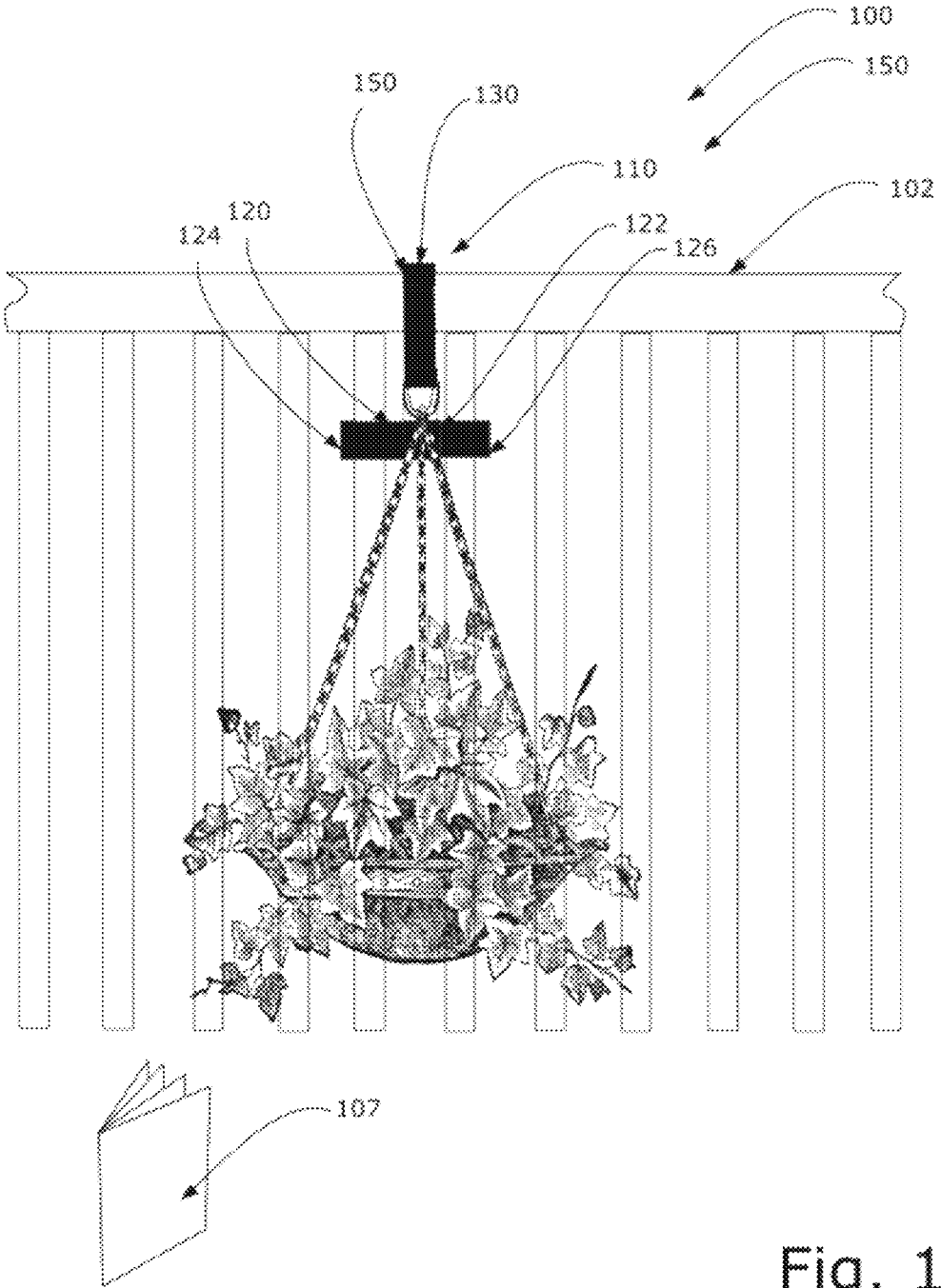
FIG. 1 is a perspective view of the removable plant hanger system during an 'in-use' condition, according to an embodiment of the disclosure.

As discussed above, embodiments of the present disclosure relate to a hanging means for plants and more particularly to removable plant hanger system as used to improve the efficiency of hanging plants from various objects and in various positions on constructions such as porches and decks with rails.

Generally speaking, in a preferred embodiment, the removable plant holder system comprises: at least one first plant holder assembly having a coupling-frame, an extension arm-member having a proximate end and a distal end; wherein the plant holder system comprises the at least one first plant holder assembly. The at least one first plant holder assembly is defined by the coupling-frame and the extension arm-member integrally combined for use; wherein the coupling-frame comprises a cross-member having a right-hooked-end and a left-hooked-end. The coupling-frame is removably mounted such that the right-hooked-end and the left-hooked-end each engage at least one vertical-rail on a railed deck. In the preferred embodiment the coupling-frame is located on a plane below the extension arm-member during an in-use condition. Relationally speaking, the coupling-frame is located perpendicular to the extension arm-member during the in-use condition and the extension arm-member extends upwardly at an angle greater than 30 degrees from the coupling-frame. To maintain relative stability the extension arm-member contours partially about a horizontal-rail of the railed deck, (the horizontal-rail is a top-rail). The distal end of the extension arm-member comprises at least one curl; wherein the plant is potted and comprises a hanging-means to hang from the at least one curl. As such, the at least one first plant holder assembly is pulled into frictional-engagement as a plant hangs, a mass of the plant pulling the coupling-frame tightly adjacent the railed deck. The extension arm-member is defined by the proximate end attached to the coupling-frame, and the distal end able to act in a capacity for hanging the plant in the pot therefrom; the coupling-frame configured for removable attachment with the railed deck.

Generally speaking, in a preferred embodiment, the removable plant holder system comprises: at least one first plant holder assembly having a coupling-frame, an extension arm-member having a proximate end and a distal end, and a support arm-member attached to the extension arm-member in a substantially parallel configuration and being positioned in a plane above the extension arm-member; wherein the plant holder system comprises the at least one first plant holder assembly. The at least one first plant holder assembly is defined by the coupling-frame, the extension arm-member, and the support arm-member integrally combined for use.

Generally speaking, in preferred embodiments, various configurations of the coupling-frame may be provided for engaging at least one vertical-rail of the railed deck in a specified manner.

Generally speaking, in a preferred embodiment, a method of holding a plant with a removable plant holder system comprises: attaching a coupling-frame of a removable plant holder system to a railed deck, wherein the removable plant holder system comprises: at least one first plant holder assembly having a coupling-frame comprising a cross-member having a right-hooked-end and a left-hooked-end for removably mounting to a railed deck, each of the right-hooked-end and the left-hooked-end engaging at least one vertical-rail of the railed deck; an extension arm-member having a proximate end attached to the coupling-frame and a distal end configured for hanging a plant therefrom, and optionally, a support arm-member attached to the extension arm-member in a substantially parallel configuration and being positioned in a plane above the extension arm-member; and hanging a plant upon said distal end of the extension arm-member.

Referring now more specifically to the drawings by numerals of reference, there are shown in FIGS. 1-8, various views of several embodiments of removable plant hangers 100, 200, 300.

FIG. 1 shows a removable plant hanger 100 during an 'in-use' condition 150, according to an embodiment of the present disclosure. The removable plant hanger 100 may be beneficial for use by a user to hang potted plants from a railed deck 102 or the like. As illustrated, the removable plant hanger 100 in a first embodiment may include at least one first plant holder assembly 110 having a coupling-frame 120, an extension arm-member 130 (having a proximate end 132, and a distal end 134); wherein the plant holder system 100, as such, comprises the at least one first plant holder assembly 110. The at least one first plant holder assembly 110 in this embodiment is defined by the coupling-frame 120 and the extension arm-member 130 integrally combined for use. As such the extension arm-member 130 is defined by the proximate end 132 attached to the coupling-frame 120, and the distal end 134 is thus able to act in a capacity for hanging a (potted) plant therefrom, the coupling-frame 120 being configured for removable attachment with a railed deck 102.

According to one embodiment, the removable plant hanger 100 may be arranged as a kit 105. In particular, the removable plant hanger 100 may further include a set of instructions 107. The instructions 107 may detail functional relationships in relation to the structure of the removable plant hanger 100 such that the removable plant hanger 100 can be used, maintained, or the like, in a preferred manner.

Figure 2:
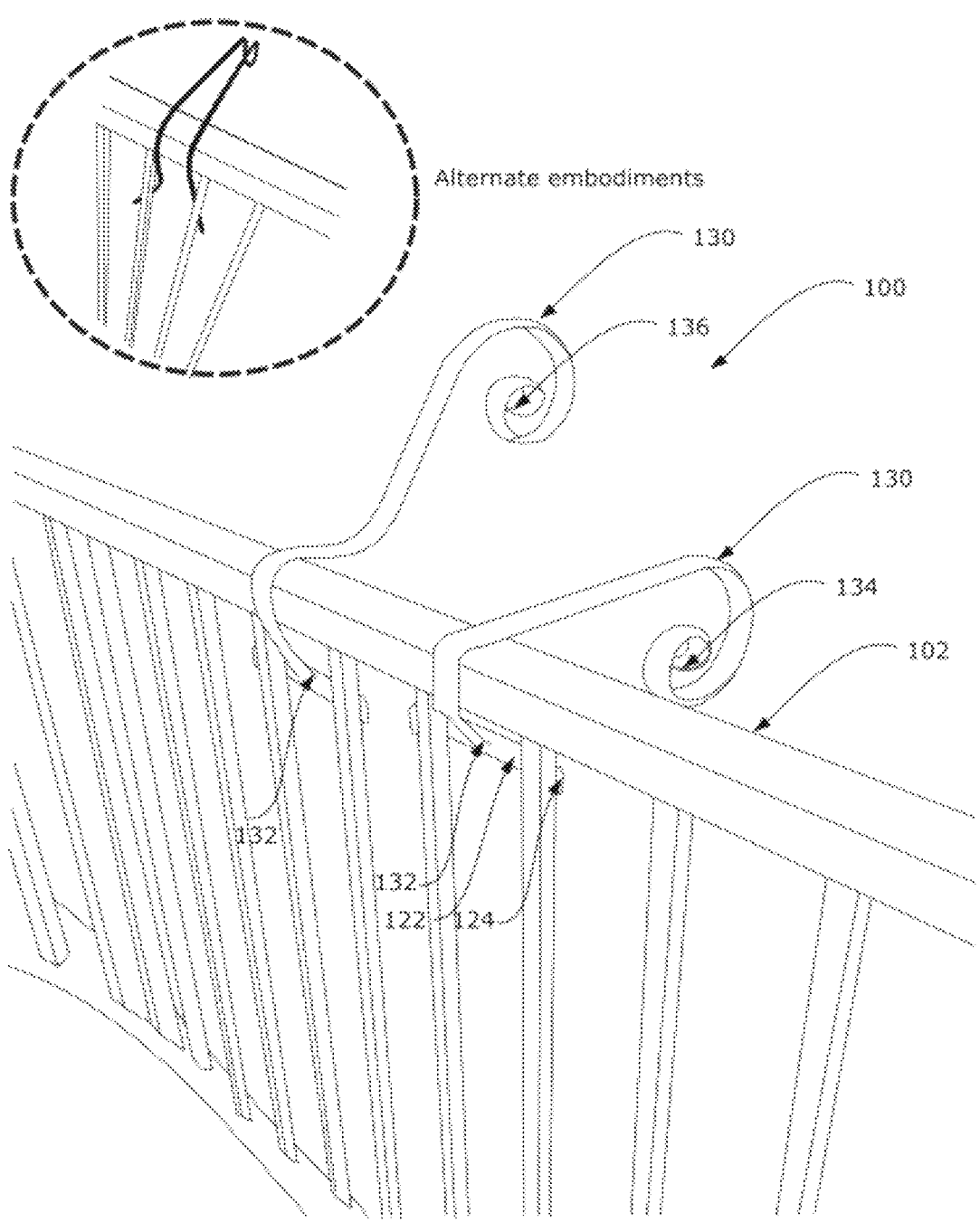
FIG. 2 is a perspective view of the removable plant hanger of FIG. 1, according to an embodiment of the present disclosure.
Figure 3:
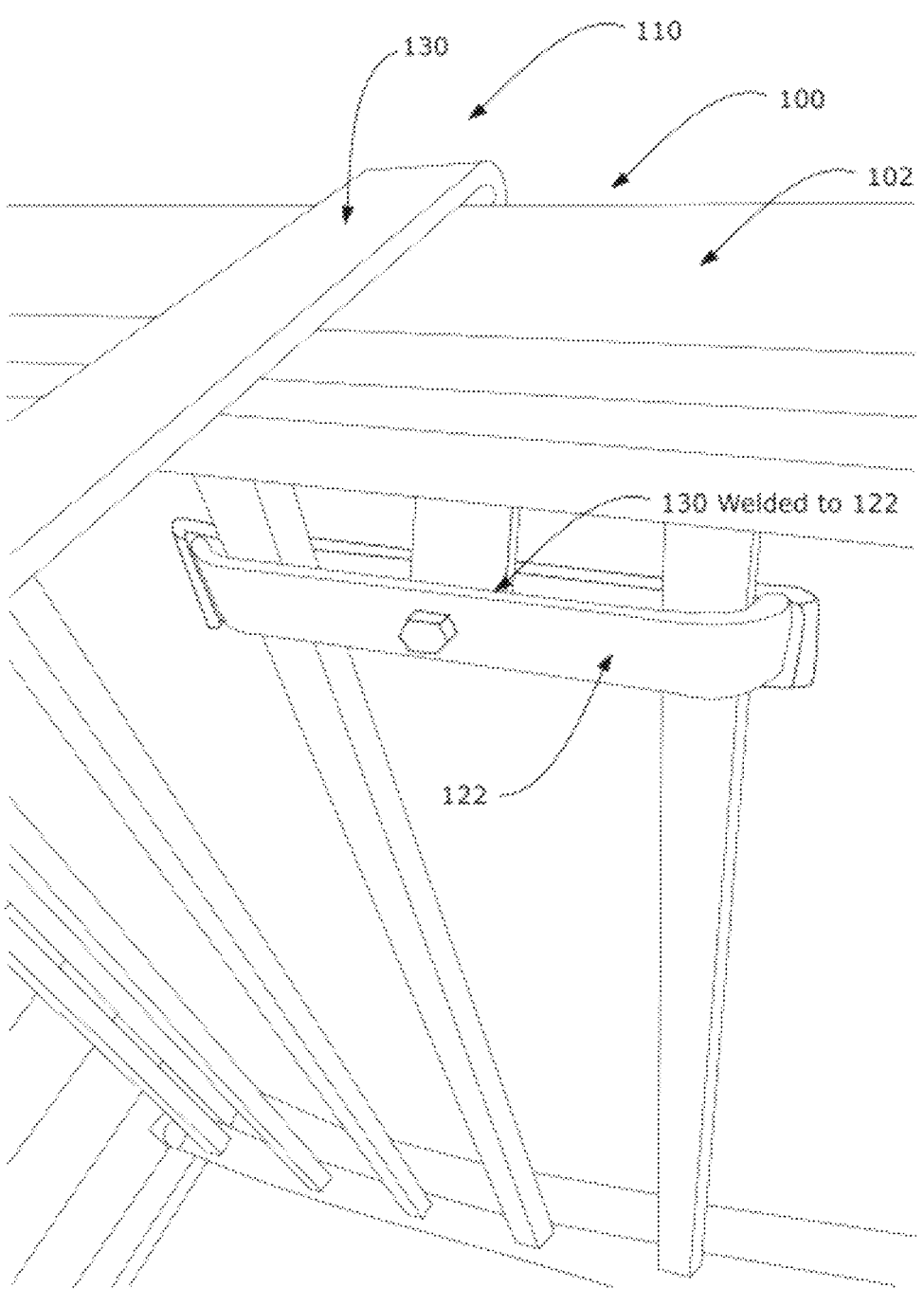
FIG. 3 is a perspective view of the removable plant hanger of FIG. 1, according to an embodiment of the present disclosure.
Figure 4:
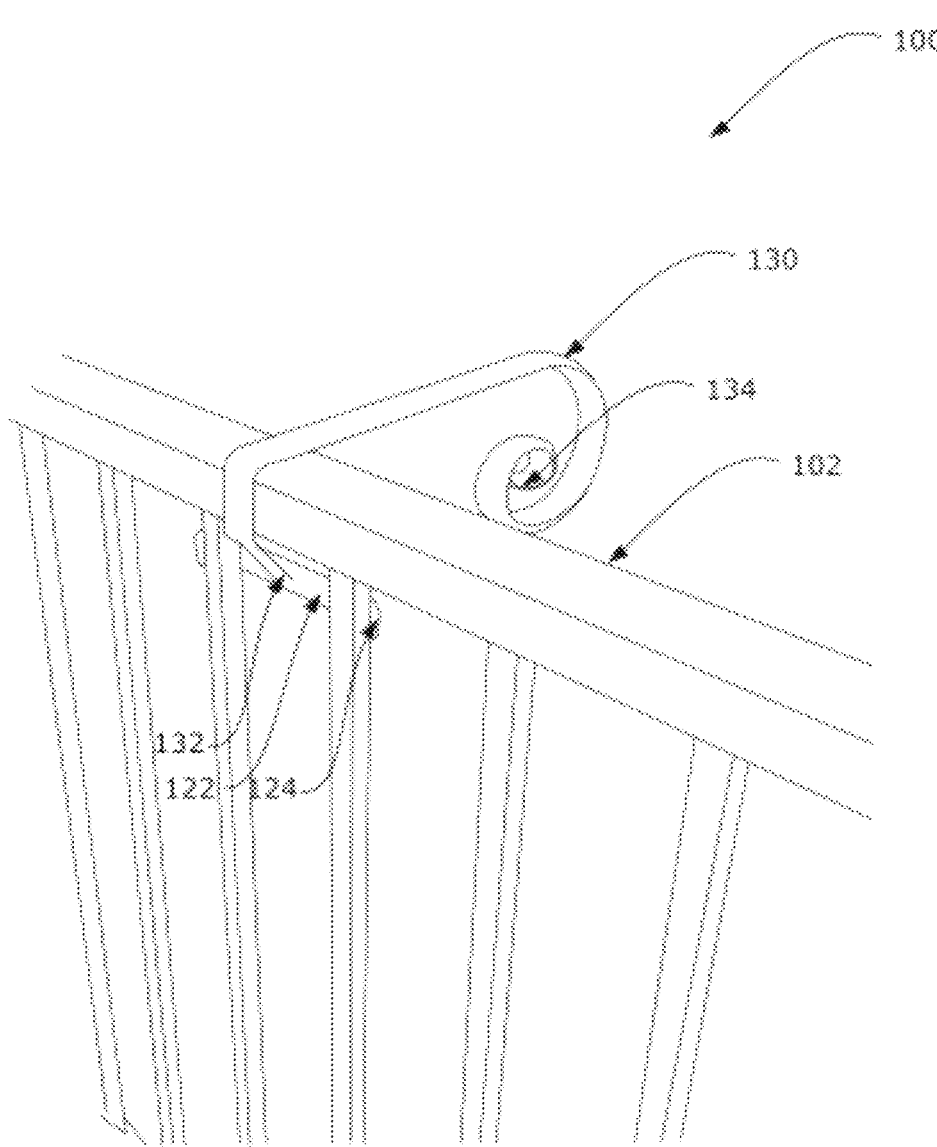
FIG. 4 is a perspective view of the removable plant hanger of FIG. 1, according to an embodiment of the present disclosure.

Referring now to FIGS. 2-4 showing various views of the removable plant hanger 100 of FIG. 1, according to an embodiment of the present disclosure. As above, the removable plant holder system 100 may include the coupling-frame 120 comprising a cross-member 122 having a right-hooked-end 124 and a left-hooked-end 126; wherein the coupling-frame 120 is removably mounted such that the right-hooked-end 124 and the left-hooked-end 126 each engage at least one vertical-rail on the railed deck, as shown. The coupling-frame 120 is located on a plane below the extension arm-member 130 during an in-use condition 150, as shown in FIG. 1. Generally, the coupling-frame 120 is located (substantially) perpendicular to the extension arm-member 130 during the in-use condition 150. The plant referred to herein is preferably potted and comprises a hanging-means (chain, rope or the like as shown in FIG. 1)

to hang from the at least one curl 136. Certain alternate embodiments are shown in FIGS. 2-8. Alternate embodiments may be of a singular bent rod-member; one that allows an elevated positioning of the plant pot when hung and a version comprising an anchor is shown in FIG. 3.

Referring now to the extension arm-member 130, the extension arm-member 130 preferably extends upwardly at an angle greater than 30 degrees from the coupling-frame 120. Other angles are envisioned, as appropriate to the particular railed deck 102. The extension arm-member 130 contours partially about a horizontal-rail of the railed deck 102; wherein the horizontal-rail is a top-rail. The distal end 134 of the extension arm-member 130 comprises at least one curl 136. Certain embodiments may comprise multiple curls 136. The extension arm-member 130 extends parallel and perpendicular to the top-rail in certain embodiments and in other embodiments the extension arm-member 130 does not extend parallel to the top-rail, as shown in FIG. 2.

Figure 5:
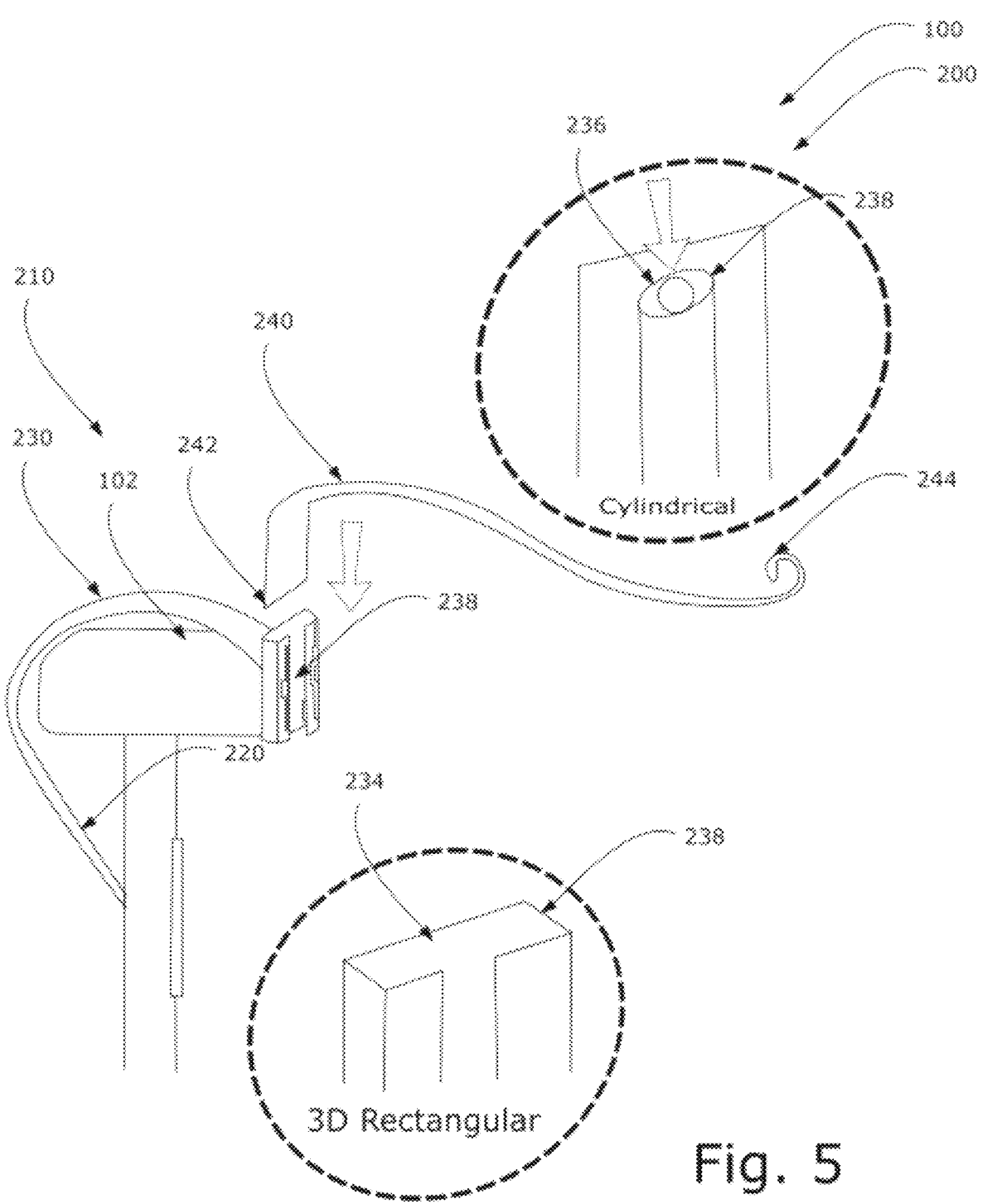
FIG. 5 is a perspective view of an alternate embodiment of the removable plant hanger, according to an embodiment of the present disclosure.

FIG. 5 shows a perspective view of an alternate embodiment of the removable plant hanger 200, according to an embodiment of the present disclosure. In this alternate embodiment of the removable plant holder system 100 the removable plant holder system 100 comprises: at least one first plant holder assembly 210 of the removable plant hanger 200 having a coupling-frame 220, a base-extension-arm-member 230 having a receiver 238, and an extender-extension-arm-member 240 having a proximate end 242, and a distal end 244; wherein the plant holder system 100 in this embodiment comprises the at least one first plant holder assembly 210. The at least one first plant holder assembly 210 is defined by the coupling-frame 220 and the base-extension-arm-member 230 combined with the extender-extension-arm-member 240 via the receiver 238 for use. As disclosed and shown the extender-extension-arm-member 240 is defined by the proximate end 242 attached to the base-extension-arm-member 230 and to coupling-frame 220, and the distal end 244 able to act in a capacity for hanging a plant therefrom. The coupling-frame 220 is configured for removable attachment with a railed deck 102. In this embodiment, the receiver 238 has an outer profile selected from a 3D-rectangular-profile 234 or a cylindrical-profile 236.

Figure 6A:
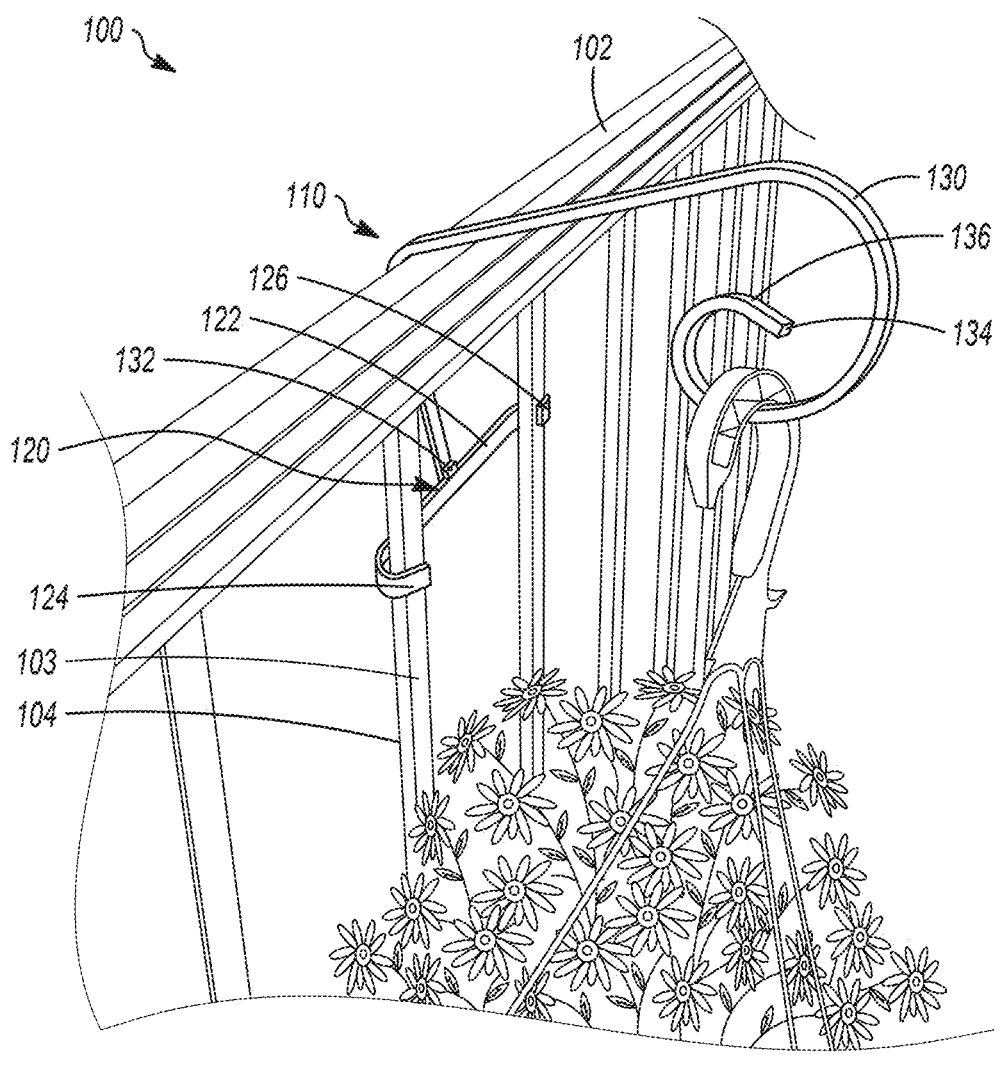
FIGS. 6A and 6B are perspective views of an alternate embodiment of the coupling-frame of the removable plant hanger of FIG. 1, according to an embodiment of the present disclosure.
Figure 6B:
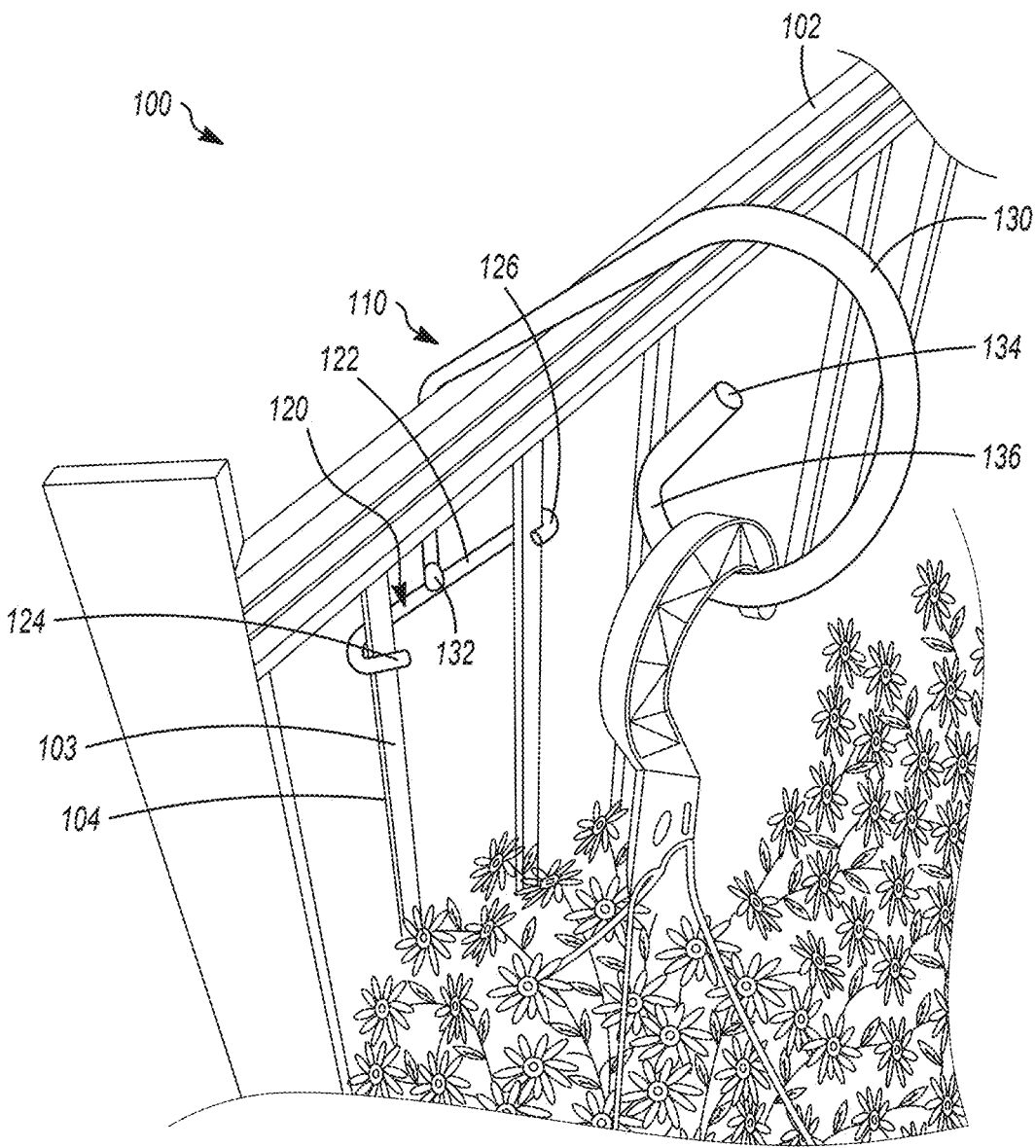

FIGS. 6A and 6B show perspective views of alternate embodiments of the coupling-frame 120 of the plant holder assembly 110. The coupling-frame 120 comprises a cross-member 122 having a right-hooked-end 124 and a left-hooked-end 126, wherein the cross-member 122 is positioned adjacent to and substantially perpendicular to the vertical-rails of the railed deck 102, when in use as shown. The hooked-ends 124, 126 are configured to each engage a vertical-rail of the railed deck 102 by contouring or wrapping around the vertical-rail such that the coupling-frame 120 is removably mounted from the railed deck 102. The cross-member 122 may be configured to engage the vertical-rails of the railed deck 102 at external faces 103 of the vertical-rails or at internal faces 104 of the vertical-rails. The external faces 103 of the vertical-rails face towards the distal end 134, whereas the internal faces 104 of the vertical-rails face away from the distal end 134. Referring to FIG. 2, the cross-member 122 engages the external faces 103 of the vertical-rails, and the right-hooked-end 124 and the left-hooked-end 126 contour towards the internal faces 104 of the vertical-rails. In comparison, the cross-members 122 of FIGS. 6A and 6B engage the internal faces 104 of the vertical-rails, and the hooked-ends 124, 126 contour towards the external faces 103 of the vertical-rails.

FIGS. 6A and 6B show additional alternative embodiments. The coupling-frame 120 and extension arm-member 130 may be formed of a flat material as shown in FIG. 6A, or a tubular material as shown in FIG. 6B. The distal end 134 of the extension arm-member 130 comprises at least one curl 136. As shown in FIG. 6A, the curl 136 may be configured to curve downwardly. As shown in FIG. 6B, the curl 136 may be configured to extend upwardly in a hook-like manner. Both the curved and hooked configurations of curls 136 securely receive and support the hanging-means of a potted plant for hanging therefrom.

Figure 7A:
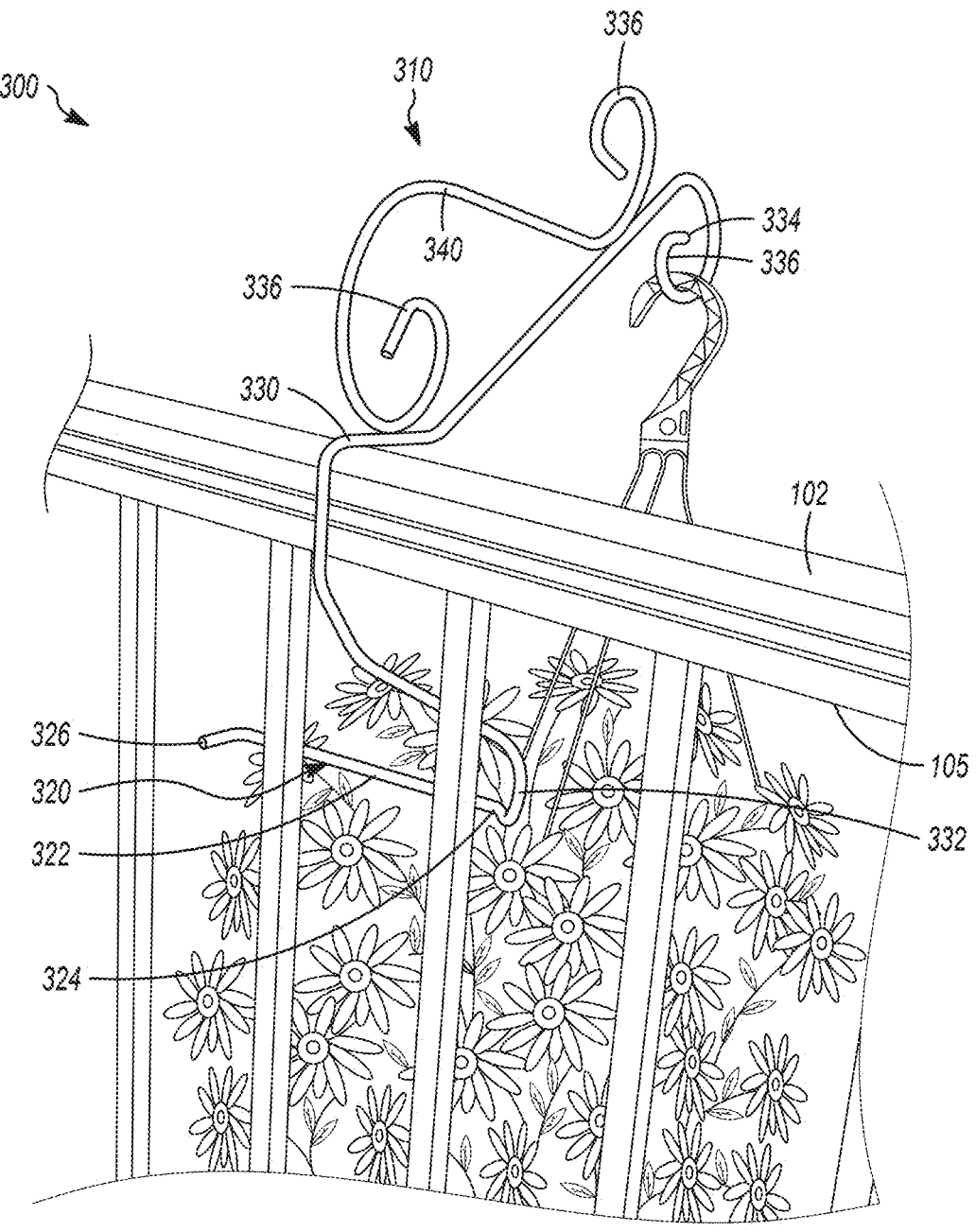
FIGS. 7A and 7B are perspective views of an alternate embodiment of the removable plant hanger, according to an embodiment of the present disclosure.

FIG. 7A shows a perspective view of an alternate embodiment of the removable plant hanger 300. The removable plant hanger 300 comprises at least one first plant holder assembly 310 having a coupling-frame 320, extension arm-member 330, and support arm-member 340. The coupling-frame 320, the extension arm-member 330, and the support arm-member 340 are integrally combined for use. The extension arm-member 330 comprises a proximate end 332 and distal end 334. The proximate end 332 of the extension arm-member 330 attaches to the coupling-frame 320. The coupling-frame 320 comprises a cross-member 322 having a right-hooked-end 324 and a left-hooked-end 326. The hooked-ends 324, 326 are configured to each engage at least one vertical-rail on the railed deck 102.

In the embodiment of FIG. 7A, the proximate end 332 attaches to the coupling-frame 320 at the right-hooked-end 324. The extension arm member 330 contours around and below a bottom face 105 of the horizontal top-rail of the railed deck 102 and partially around the vertical-rail which is engaged by the right-hooked-end 324, thereby facilitating the connection between the proximate end 332 and the right-hooked-end 324.

Figure 7B:
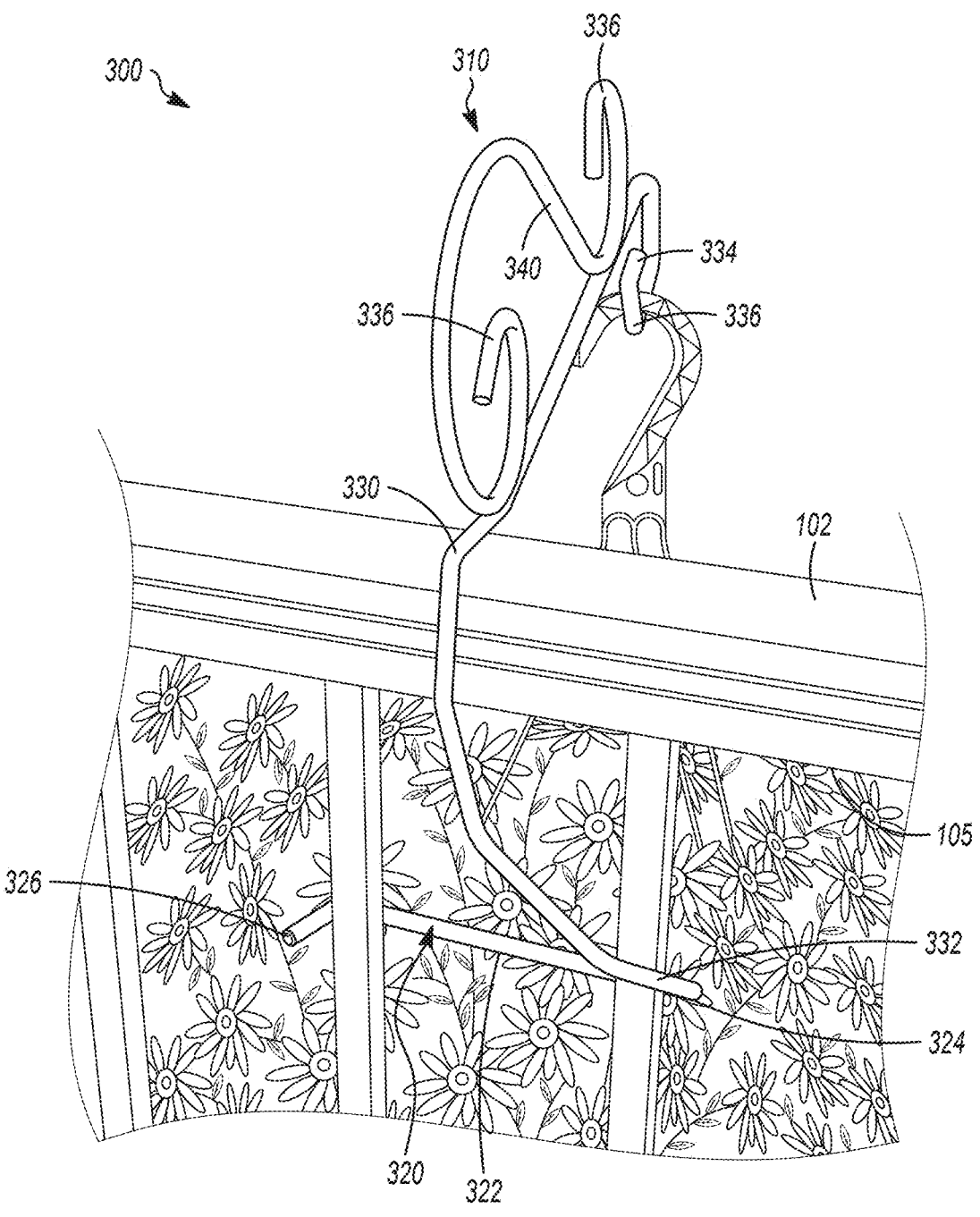

FIG. 7B shows an alternate embodiment of attachment between the proximate end 332 and the coupling-frame 120. The extension arm-member 330 partially contours around the horizontal top-rail of the railed deck 102, without contouring around or below the bottom face 105 of the top-rail, and extends to the right-hooked-end 324 which engages a vertical-rail of the railed deck 102. Configurations of attachment between the proximate end 332 of the extension arm-member 330 and the coupling-frame 320 are not limited to the embodiments shown in FIGS. 7A and 7B. For example, the proximate end 332 of the extension arm-member 330 may attach to the coupling-frame 320 at the cross-member 322, the right-hooked-end 324, or the left-hooked-end 326. As a further example, the extension arm-member 330 may partially contour around the top-rail of the railed deck 102 or contour around and below the bottom face 105 of the top-rail of the railed deck 102.

Figure 8:
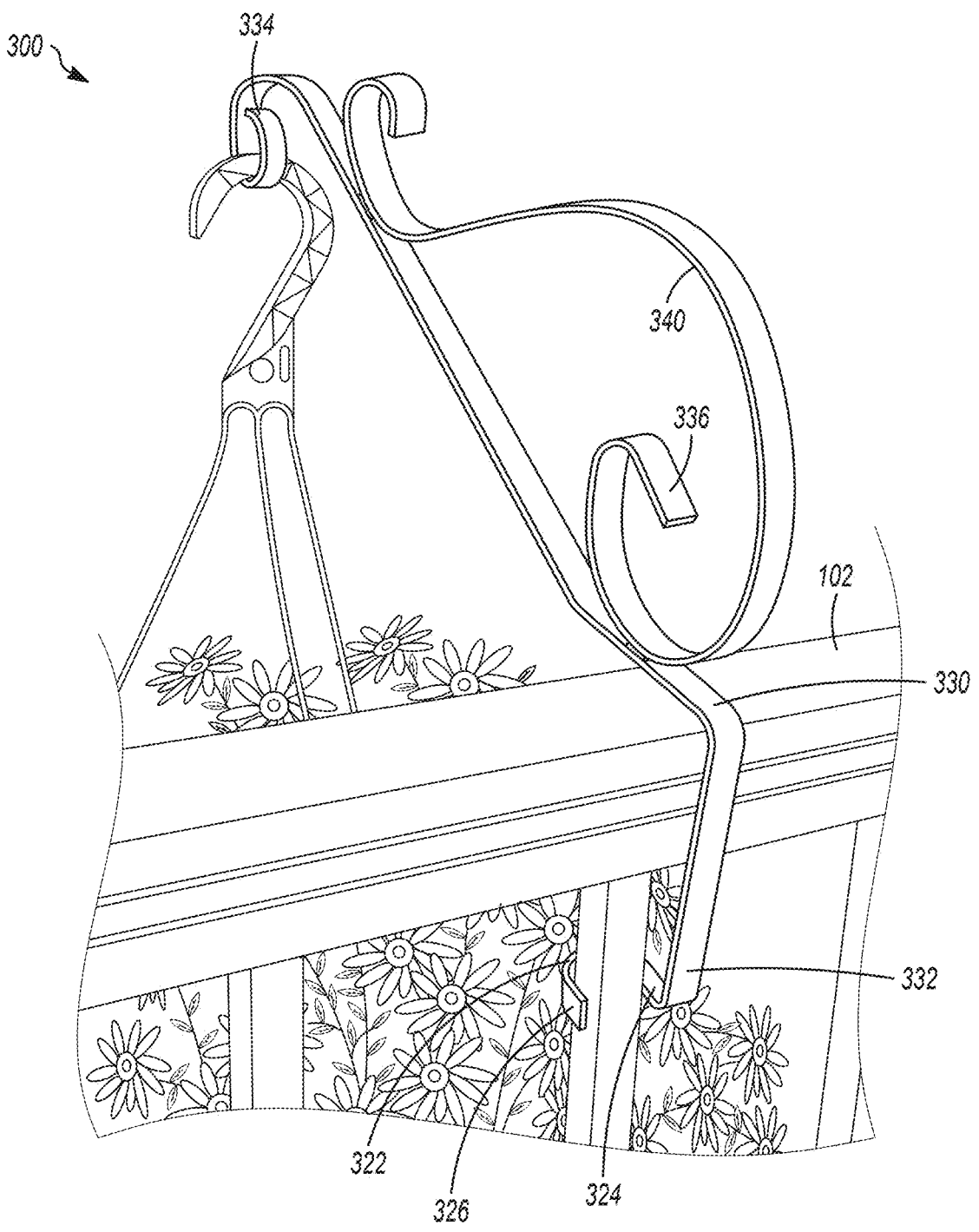
FIG. 8 is a perspective view of an alternate embodiment of the removable plant hanger of FIGS. 7A and 7B, according to an embodiment of the present disclosure.

The support arm-member 340 attaches to the extension arm-member 330 in a substantially parallel configuration, with attachment positions near the distal end 334 and proximate end 332. As shown in FIGS. 7A, 7B, and 8, the support arm-member 340 has a length extending from the distal end 334 of the extension arm-member 330 to the portion or to a point of the extension arm-member 330 which spans the horizontal top-rail of the railed deck 102. The support arm-member 340 is positioned in the plane above the extension arm-member 330, and the extension arm-member 330 is positioned in the plane above the coupling-frame 320. The support arm-member 340 has a substantially "S"-shaped profile, and optionally, may include one or more curls 336 as embellishments for aesthetic purposes. The support arm-member 340 strengthens or reinforces the extension arm-member 330 in supporting the weight of the potted plant hanging therefrom.

The extension arm-member 330 is configured in a substantially perpendicular position to the coupling-frame 320, with the distal end 334 extending at an angle greater than 30 degrees from the coupling-frame 320, as shown in FIG. 7A. This configuration may allow for an elevated positioning of the potted plant. In alternative embodiments, the distal end 334 may extend in the same plane as the top-rail of the railed deck 102 or at an angle between 0 degrees and 30 degrees from the coupling-frame 320. The distal end 334 is further configured to hang a plant therefrom. As shown in in FIGS. 7A and 7B, the distal end 334 comprises at least one curl 336 which is configured to curve downwardly to securely receive and support the hanging-means of a potted plant.

FIG. 8 shows a perspective view of an alternate embodiment of the coupling-frame 320 of the removable plant hanger 300. The coupling-frame 320 comprises a right-hooked-end 324 and a left-hooked-end 326 which are configured to engage a single vertical-rail of the railed deck 102. The proximate end 332 of the extension arm-member 330 attaches to the right-hooked-end 324. The extension arm-member 330 extends upwardly towards the horizontal top-rail of the railed deck 102 and partially contours around the top-rail. The distal end 334 of the extension arm-member 330 extends outwardly from the coupling-frame 320, and comprises at least one curl 336 for securely receiving and supporting the hanging-means of a potted plant.

The plant holder assembly 110, 210, 310 is pulled into frictional engagement as the plant hangs, with a mass (weight and gravity) of the plant pulling the coupling-frame 120, 220, 320 tightly adjacent the railed deck 102. The plant holder assembly 110, 210, 310 may be a welded-assembly or formed of a one-piece manufacture such as those made in a molding process. The plant holder assembly 110, 210, 310 preferably comprises ferrous material or may comprise non-ferrous or other materials such as composites, plastics or the like. The removable plant holder system 100, 200, 300 may further comprise a set of instructions, wherein the removable plant holder system 100, 200, 300 is arranged as a kit as shown in FIGS. 1-2. Alternate embodiments as shown in FIGS. 5-8 may be included in the kit.

In operation (the 'in-use' condition), the coupling-frame 120, 220, 320 is attached to the vertical-rails of the railed deck 102 by engaging the right-hooked end 124, 324 and left-hooked end 126, 326 of the cross-member 122, 322 to at least one vertical-rail of the railed deck 102. The coupling-frame 120, 220, 320 is located on a plane below the extension arm-member 130, 230, 330, and is perpendicular to the extension arm-member 130, 230, 330. The extension arm-member 130, 230, 330, having its proximate end 132, 242, 332 attached to the coupling-frame 120, 220, 320 and its distal end 134, 244, 334 comprising one or more curls 136 is positioned to contour about the horizontal-rail of the railed deck 102. Depending on the embodiment, the extension arm-member 130, 230, 330 may extend parallel and perpendicular to the top-rail, or may not extend parallel to the top-rail. Depending on the embodiment, the extension arm-member 130, 230, 330 may extend upwardly at an angle greater than 30 degrees from the coupling-frame 120, 220, 320, or contour partially about a horizontal top-rail of the railed deck 102. A hanging-member of a potted plant is placed within the curl 136. The downward curve or the upward hook of the curl 136 securely receives and supports the hanging-means of the potted plant for hanging therefrom. The plant holder assembly 110, 210, 310 is pulled into frictional engagement as the plant hangs since the mass (weight and gravity) of the plant pulls the coupling-frame 120, 220, 320 tightly against the railed deck 102. In alternate embodiments (as shown in FIGS. 7A, 7B, and 8), the support arm-member 340 strengthens or reinforces the extension arm-member 330 in supporting the weight of the plant, in addition to providing ornamentation by its "S"-shaped profile and optionally, one or more curls 336.

It should be apparent, however, to those skilled in the art that many more modifications besides those already described are possible without departing from the inventive concepts herein. The inventive subject matter, therefore, is not to be restricted except in the scope of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or integrated with other elements, components, or steps that are not expressly referenced. Accordingly, various changes and modifications can be made to the exemplary embodiments and uses without departing from the scope of the invention as defined in the claims that follow.

What is claimed is:

1. A removable plant holder system comprising:
at least one first plant holder assembly having:
a coupling-frame comprising a cross-member having a right-hooked-end and a left-hooked-end for removably mounting to a railed deck, each of the right-hooked-end and the left-hooked-end engaging at least one vertical-rail of the railed deck;
an extension arm-member having a proximate end attached to the coupling-frame and a distal end configured for hanging a plant therefrom; and
optionally, a support arm-member attached to the extension arm-member in a substantially parallel configuration and being positioned in a plane above the extension arm-member.

2. The removable plant holder system of claim 1, wherein the support arm-member comprises a length extending from the distal end of the extension arm-member to a portion of the extension arm-member spanning a horizontal top-rail of the railed deck during an in-use condition.

3. The removable plant holder system of claim 2, wherein the support arm-member comprises a substantially "S"-shaped profile and optionally, one or more embellishments.

4. The removable plant holder system of claim 1, wherein the right-hooked end and the left-hooked end contour around the vertical rail to position the cross-member adjacent to and substantially perpendicular to the vertical rails of the railed deck during an in-use condition.

5. The removable plant holder system of claim 4, wherein the cross-member is configured to engage an internal face of the vertical-rail facing away from the distal end, with the left-hooked-end and the right-hooked end contouring towards an external face of the vertical-rail during the in-use condition.

6. The removable plant holder system of claim 1, wherein the coupling-frame is located on a plane below the extension arm-member during an in-use condition.

7. The removable plant holder system of claim 6, wherein the coupling-frame is located perpendicular to the extension arm-member during an in-use condition.

8. The removable plant holder system of claim 1, wherein the extension arm-member extends upwardly at an angle greater than 30 degrees from said coupling-frame.

9. The removable plant holder system of claim 8, wherein the extension arm-member contours partially about a horizontal top-rail of the railed deck.

10. The removable plant holder system of claim 9, wherein the extension arm-member extends parallel and perpendicular to the top-rail.

11. The removable plant holder system of claim 9, wherein the extension arm-member does not extend parallel to the top-rail.

12. The removable plant holder system of claim 1, wherein the distal end of the extension arm-member comprises at least one curl curving downwardly or extending upwardly forming a hook for supporting a hanging-means of the plant.

13. The removable plant holder system of claim 1, wherein the coupling-frame and extension arm-member are formed of a flat material or a tubular material.

14. The removable plant holder system of claim 1, wherein the proximate end of the extension arm-member attaches to the coupling-frame at the right-hooked-end.

15. The removable plant holder system of claim 14, wherein the extension arm-member contours around and below a bottom face of a horizontal top-rail of the railed deck and partially around a vertical-rail engaged by the right-hooked-end during an in-use condition.

16. The removable plant holder system of claim 15, wherein the extension arm-member partially contours around the top-rail avoiding the bottom face, and extends to the right-hooked-end engaging the vertical-rail.

17. The removable plant holder system of claim 1, wherein the right-hooked-end and the left-hooked-end are configured to together engage a single vertical-rail.

18. The removable plant holder system of claim 17, wherein the proximate end of the extension arm-member attaches to the right-hooked-end, the extension arm-member extending upwardly towards a horizontal top-rail and partially contouring around the top-rail, the distal end of the extension arm-member extending outwardly from the coupling-frame during an in-use condition.

19. The removable plant holder system of claim 1, wherein the at least one first plant holder assembly is pulled into frictional-engagement as the plant hangs, a mass of the plant pulling the coupling-frame tightly adjacent the railed deck.

20. The removable plant holder system of claim 1, wherein the at least one first plant holder assembly is a welded-assembly.

21. The removable plant holder system of claim 1, wherein the at least one first plant holder assembly is formed of a one-piece manufacture.

22. The removable plant holder system of claim 1, wherein the at least one first plant holder assembly comprises ferrous material.

23. A removable plant holder system comprising:
at least one first plant holder assembly having:
a coupling-frame comprising a cross-member having a right-hooked-end and a left-hooked-end for removably mounting to a railed deck, each of the right-hooked-end and the left-hooked-end engaging at least one vertical-rail of the railed deck;
an extension arm-member having a proximate end attached to the coupling-frame and a distal end configured for hanging a plant therefrom; and
a support arm-member attached to the extension arm-member in a substantially parallel configuration and being positioned in a plane above the extension arm-member.

* * * * *